(12) United States Patent  
Umeda et al.

(10) Patent No.: US 8,172,296 B2
(45) Date of Patent: May 8, 2012

(54) PARCEL SHELF STRUCTURE

(75) Inventors: Yuichiro Umeda, Saitama (JP); Kiyoshi Hara, Saitama (JP); Keisuke Kato, Saitama (JP); Nobumoto Sekiguchi, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/877,590

(22) Filed: Sep. 8, 2010

(65) Prior Publication Data

US 2011/0057467 A1    Mar. 10, 2011

(30) Foreign Application Priority Data

Sep. 8, 2009 (JP) .................................. 2009-206702

(51) Int. Cl.
*B60R 5/04* (2006.01)
(52) U.S. Cl. ................ 296/24.44; 296/24.43; 296/37.16
(58) Field of Classification Search ................ 296/24.4, 296/24.43, 24.44, 24.45, 37.16
See application file for complete search history.

(56) References Cited

U.S. PATENT DOCUMENTS

| | | | | |
|---|---|---|---|---|
| 4,222,600 A | * | 9/1980 | Cripps et al. | 296/37.1 |
| 6,176,535 B1 | * | 1/2001 | Chaloult et al. | 296/37.16 |

FOREIGN PATENT DOCUMENTS

| | | | |
|---|---|---|---|
| EP | 0061928 | * | 10/1982 |
| JP | 57-084137 U | | 5/1982 |
| JP | 63-134854 U | | 9/1988 |
| JP | 2002-225634 A | | 8/2002 |
| JP | 2003002120 | * | 1/2003 |
| JP | 2009-067172 A | | 4/2009 |

OTHER PUBLICATIONS

Notification of Reason for Refusal dated Jul. 12, 2011, issued in corresponding Japanese Patent Application No. 2009-206702.

* cited by examiner

*Primary Examiner* — Dennis Pedder
(74) *Attorney, Agent, or Firm* — Westerman, Hattori, Daniels & Adrian, LLP

(57) ABSTRACT

An object of the present invention is to provide a parcel shelf structure whose opening can be kept largely when the tailgate is opened. In order to achieve the above object, a parcel shelf comprising: a front shelf having a front end rotatably supported by a vehicle body; a rear shelf fixed to a tailgate; and a strap to connect the tailgate to a position apart from the front end of the front shelf in a rear direction, in which when the tailgate is opened, the front shelf is apart from the rear shelf, and when the tailgate is closed, the front shelf is in touch with the rear shelf is provided.

5 Claims, 4 Drawing Sheets

PARCEL SHELF STRUCTURE

CROSS REFERENCE TO RELATED APPLICATION

The present application claims benefit of the filing date of Japanese Patent Application No. 2009-206702 filed on Sep. 8, 2009, the disclosure of which is incorporated herein by reference.

BACKGROUND OF THE INVENTION

1. Field of the Invention

The present invention relates to a parcel shelf structure applied to a vehicle which is provided with a trunk extending in a front-rear direction.

2. Description of the Related Art

For example, as a so-called hatchback-type vehicle in which a trunk compartment to which accessible from a lift-up type tailgate is not separated from a passenger compartment at the front of the trunk compartment, various of vehicles which are provided with shelves (racks) for covering upper openings of the trunk compartments have been proposed. A front end of this kind of shelf is rotatably supported by a vehicle body, a rear end of the shelf is linked to the tailgate by straps, and the shelf is pulled up by the straps in accordance with an opening operation of the tailgate so as to open the shelf (e.g., see JP 2009-067172 A).

SUMMARY OF THE INVENTION

However, if the prior art is applied to a vehicle which is provided with a trunk compartment extending in the front-rear direction, there arises a problem that the shelf can not be opened largely when the tailgate is opened.

Therefore, an object of the present invention is to provide a parcel shelf structure whose opening can be kept largely when the tailgate is opened in order to solve the above problem.

The present invention provides a parcel shelf which is divided into front and rear parts, the parcel shelf comprising: a front shelf having a front end which is rotatably supported by a vehicle body; a rear shelf which is fixed to a tailgate; and a strap to connect the tailgate to the front shelf, a position to which the strap is connected is apart from the front end of the front shelf in a rear direction, in which when the tailgate is opened, the front shelf is apart from the rear shelf, and when the tailgate is closed, the front shelf is in touch with the rear shelf.

According to the present invention, the parcel shelf is divided into the front shelf and the rear shelf, the front shelf is rotatable around an axis of the front end by the strap in accordance with the opening operation of the tailgate, and the rear shelf is fixed to the tailgate. As a result, it becomes possible to open the opening which faces the trunk largely when the tailgate is opened.

That is, because the rear shelf which is fixed to the tailgate is opened in accordance with the opening operation (at the same time of the opening operation) of the tailgate, it becomes possible to obtain a large opening portion relative to the trunk. In this way, it becomes possible to reduce an oppressive feeling when the tailgate is operated. Also, for example, opening the rear shelf upward largely facilitates loading/unloading baggage, etc., into/from an inner side of the trunk.

DETAILED DESCRIPTION OF THE PREFERRED EMBODIMENTS

Hereinafter, with reference to FIGS. 1-3, one embodiment of the present invention will be explained.

Figure 1:
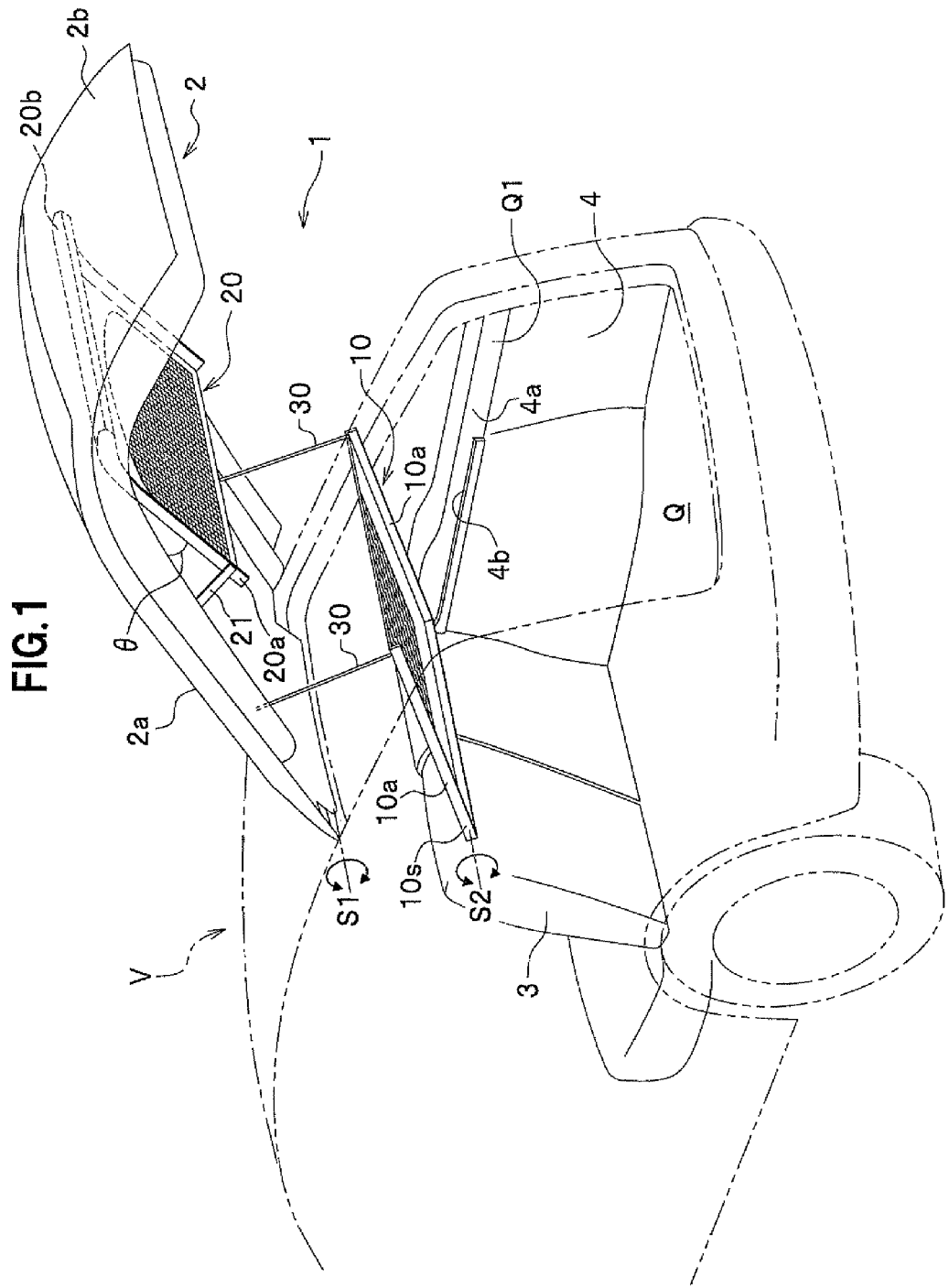
FIG. 1 is a perspective view showing a rear portion of a vehicle which is provided with a parcel shelf structure of this embodiment with a tailgate opened.

As shown in FIG. 1, a parcel shelf structure of this embodiment is preferably applied to a vehicle which is provided with a trunk extending in a front-tear direction among so-called hatchback-type vehicles V. Also, not limited to the hatchback-type vehicle, the parcel shelf structure of this embodiment can be applied to a vehicle extending in a front-rear direction such as so-called a station wagon-type vehicle. In addition, in this embodiment, the term "front" means a front side of the vehicle, the term "rear" means a rear side of the vehicle, the term "up" means vertically upward, the term "down" means "vertically downward", and the term "right and left" means "vehicle width direction".

Figure 2:
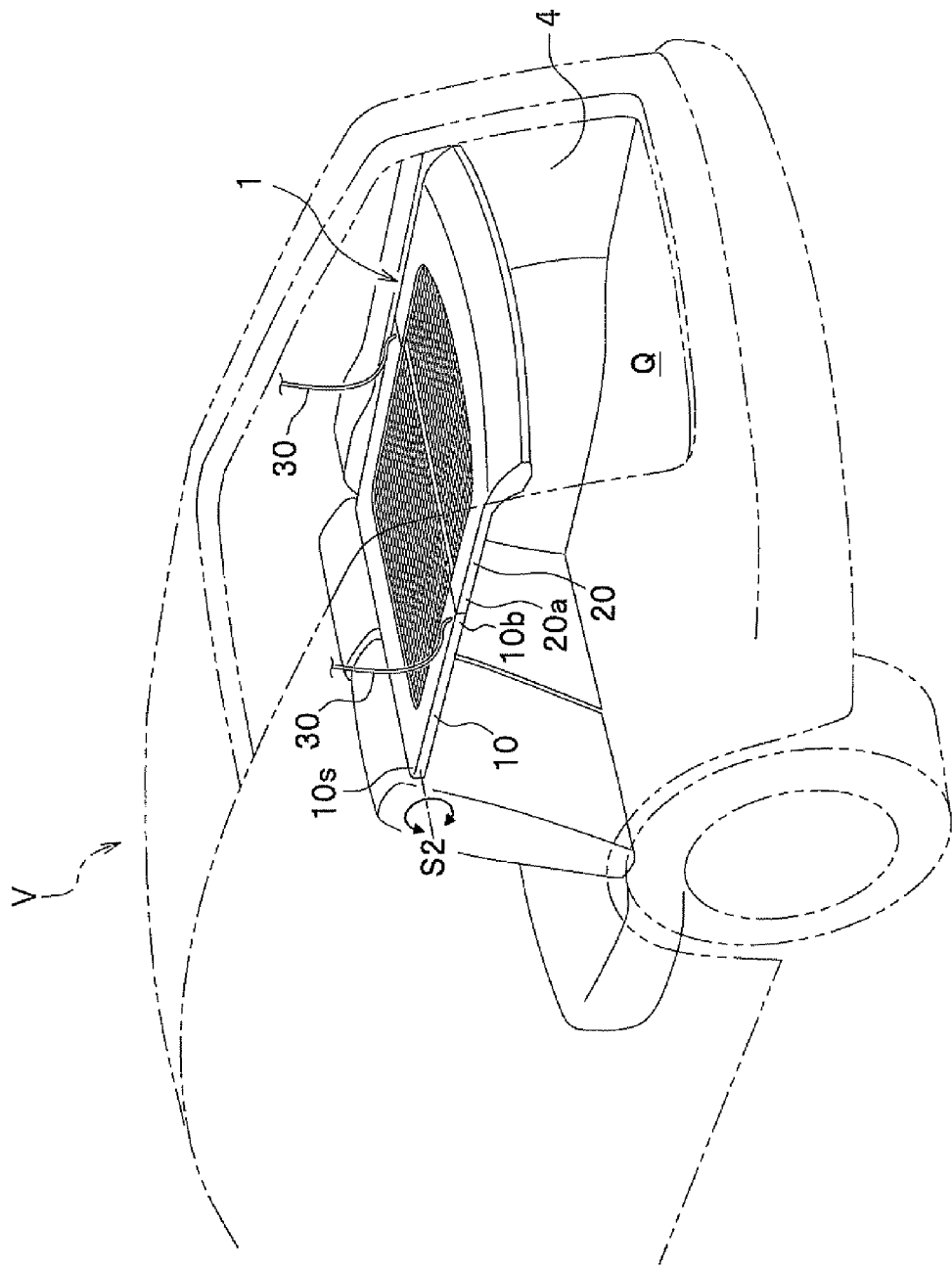
FIG. 2 is a perspective view showing the rear portion of the vehicle which is provided with the parcel shelf structure of this embodiment with the tailgate closed.

The parcel shelf structure of this embodiment is provided with a parcel shelf 1 comprising: a front shelf 10; a rear shelf 20; and straps 30, 30, in which the front shelf 10 and the rear shelf 20 can cover an opening Q1 of a trunk Q at the rear of a seatback 3 in a compartment when a tailgate 2 is closed (see FIG. 2). Here, the trunk Q and the opening Q1 are regions surrounded by a seatback 3 and side panels 4 (only right side is shown) which are provided on both right and left sides of the vehicle rear portion, and are regions arranged at a height corresponding to that of an upper edge portion 4a of the side panel 4.

The tailgate 2 is a lift-up type tailgate, and its front end is rotatably (openably and closably) attached to a roof side of the vehicle V via hinges (not shown) and dampers (not shown). In addition, an axis S1 which is a rotation fulcrum of the tailgate 2 is, for example, arranged above the seatback 3 in the vehicle. Also, the tailgate 2 includes a inclined portion 2a which inclines downward from the front end of the tailgate 2 in a rear direction, and a vertical portion 2b which extends approximately vertically downward from a rear end of the inclined portion 2a. A rear window glass (not shown) is attached to the inclined portion 2a, and various kinds of lamps (not shown) are attached to an outer surface of the vertical portion 2b.

The front shelf 10 is formed as a rectangular plate, has an area to cover a front half of the opening Q1 of the trunk Q, and its front end 10s is rotatably supported around the axis S2 relative to both right and left side panels 4 (the vehicle body). This axis S2 is arranged vertically downward relative to (below) the axis S1.

In addition, a mechanism to rotatably support the front shelf 10 is not limited. For example, axial projections (not shown) may be formed at both right and left ends of the front end 10s of the front shelf 10, bearing portions (not shown) into which the axial projections are rotatably inserted respectively may be formed on the side panels 4, and the front shelf 10 may be rotatably supported by the vehicle body.

In addition, at upper edge portions 4a of the side panels 4, step-shaped supporting portions 4b (only right side is shown) are formed. When the tailgate 2 is closed so that the front shelf 10 is made to be horizontal, the supporting portions 4b touch and support right and left edge portions 10a, 10a of the front shelf 10. In this way, when the tailgate 2 is closed, the front shelf 10 is prevented from rotating below the upper edge portion 4a.

The rear shelf 20 is formed as an approximately rectangular plate, and is fixed to the tailgate 2. That is, a rear end 20b of the rear shelf 20 is fixed to an inner wall of the tailgate 2 with bolts (not shown), etc., and both right and left ends of the front end 20a are fixed to the inclined portion 2a of the tailgate 2 via supporting plates 21 (only left side is shown). That is, the rear shelf 20 is fixed to the tailgate 2, and is operated in accordance with the rotating operation (opening and closing operation) of the tailgate 2 (at the same time of the rotating operation). In addition, a mounting angle θ of the rear shelf 20 relative to the tailgate 2 (see FIG. 1) is set to an angle to be horizontal when the tailgate 2 is closed completely.

In addition, the front shelf 10 and/or the rear shelf 20 may be formed as plates entirely, but are not limited to this. A peripheral edge portion may be made of a synthetic resin, etc., having high stiffness, and the other portion than the peripheral edge portion may be made of a sheet material such as a meshed material.

Also, a sheet which can be wrapped around the front shelf 10 and/or the rear shelf 20 except the peripheral edge portion of the front shelf 10 and/or the rear shelf 20 (or which can be folded like a curtain) may be provided so that spaces above and below the parcel shelf 1 (the front shelf 10 and/or the rear shelf 20) communicate with each other when the sheet is wrapped (or folded). In this way, baggage can be put on the sheet when the sheet is not wrapped, and baggage whose height is higher than those of the front shelf 10 and the rear shelf 20 can be loaded when the sheet is wrapped. In addition, the front shelf 10 may be removably attached to the side panel 4. Likewise, the rear shelf 20 may be removably attached to the tailgate 2.

As shown in FIG. 2, an end face of the rear end 10b of the front shelf 10 and an end face of the front end 20a of the rear shelf 20 are formed to be plane along the vertical direction (along the up and down direction). When the tailgate 2 is closed (closed completely), the front shelf 10 becomes coplanar with the rear shelf 20 with the rear end 10b in touch with the front end 20a. In addition, the configuration is not limited to this. For example, the end face of the rear end 10b and the end face of the front end 20a may be formed to be convex so that they overlap one another. When the tailgate 2 is closed, the front shelf 10 becomes coplanar with the rear shelf 20.

A pair of straps 30 are provided on both right and left sides of the front shelf 10, an upper end of the strap 30 is connected (linked) to the tailgate 2, and an lower end of the strap 30 is connected to a position behind the axis S2 of the front shelf 10. In addition, with respect to the strap 30, a fixed position at the tailgate 2 and a fixed position at the front shelf 10 can be appropriately set in accordance with an angle of the front shelf 10 when the tailgate 2 is opened. Also, the strap 30 may be a string made of a synthetic fiber, or may be a metallic wire.

In addition, in order to prevent the strap 30 from sagging at the time of closing the tailgate 2 completely, an inserting hole (not shown) into which the strap 30 is inserted is formed on the front shelf 10, a weight (not shown), etc., is connected to the lower end of the strap 30, and the lower end of the strap 30 is caused to hang below the front shelf 10 by the weight (not shown) when the tailgate 2 is closed completely.

In this way, when the completely closed tailgate 2 is opened, at the beginning of opening the tailgate 2, the strap 30 is moved through the inserting hole (not shown) by the rotating operation of the tailgate 2, the weight is pulled up by the strap 30 after the weight connected to lower end of the strap 30 runs into a through hole of the front shelf 10, and the front shelf 10 is rotated around the axis S2.

Also, the strap 30 is not limited to be fixed to the tailgate 2. For example, a loop or a hook (not shown) may be formed at the upper end of the strap 30. The loop or the hook may be hitched to a latch portion (not shown) formed on the tailgate 2 so that the strap 30 is made to be removable. By removing the strap 30 from the tailgate 2, the front shelf 10 is made not to be moved when the tailgate 2 is opened.

Next, with reference to FIG. 3, the operation of the parcel shelf 1 which is provided with the parcel shelf structure of this embodiment will be explained. First, as shown in FIG. 3 with a solid line, when the tailgate 2 is closed completely, the right and left edge portions 10a, 10a of the front shelf 10 (see FIG. 1) touch the supporting portions 4b so that the front shelf 10 is made to be horizontal (see FIG. 2), the rear shelf 20 is also made to be horizontal, the front end 20a of the rear shelf 20 touches the rear end 10b of the front shelf 10, and the front shelf 10 becomes coplanar with the rear shelf 20. In this way, the opening Q1 of the trunk Q is entirely covered by the front shelf 10 and the rear shelf 20 (see FIG. 2).

Also, when the completely closed tailgate 2 is opened, the tailgate 2 is rotated around the axis S1 in a counterclockwise direction, and the rear shelf 20 is rotated around the axis S1 in the counterclockwise direction like the tailgate 2. On the other hand, after the tailgate 2 is opened by a predetermined angle, the strap 30 is strained, and the front shelf 10 is pulled up by the strap 30. After that, the front shelf 10 is rotated around the axis S2 in the counterclockwise direction in accordance with the rotation of the tailgate 2 until the tailgate 2 is opened completely.

Figure 3:
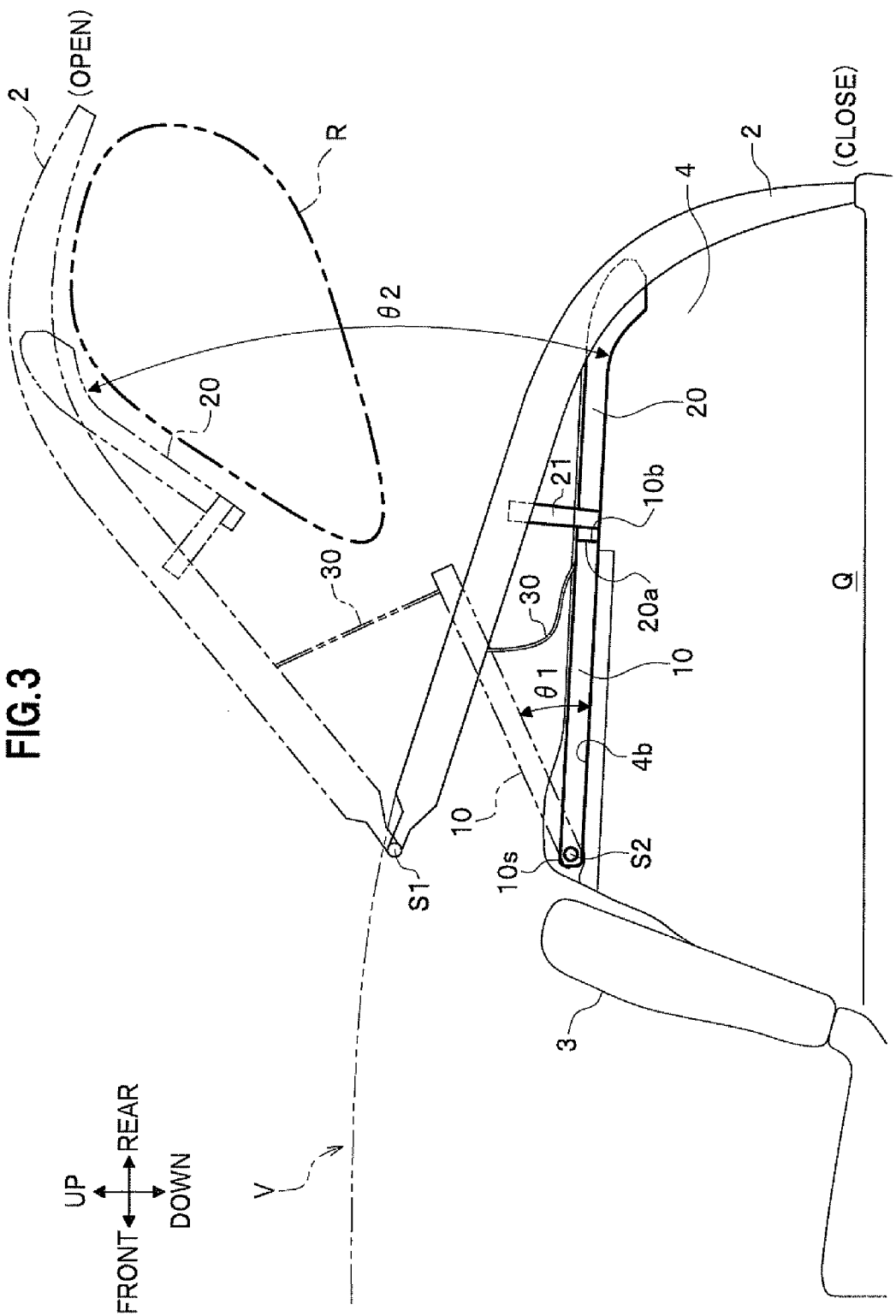
FIG. 3 is a diagram showing the opened/closed rear portion of the vehicle which is provided with the parcel shelf structure of this embodiment.

In this way, when the tailgate 2 is opened completely as shown in FIG. 3 with a broken line, the front shelf 10 is opened by an angle θ1, and the rear shelf 20 which is apart from the front shelf 10 is opened by an angle θ2 which is greater than the angle θ1.

Figure 4:
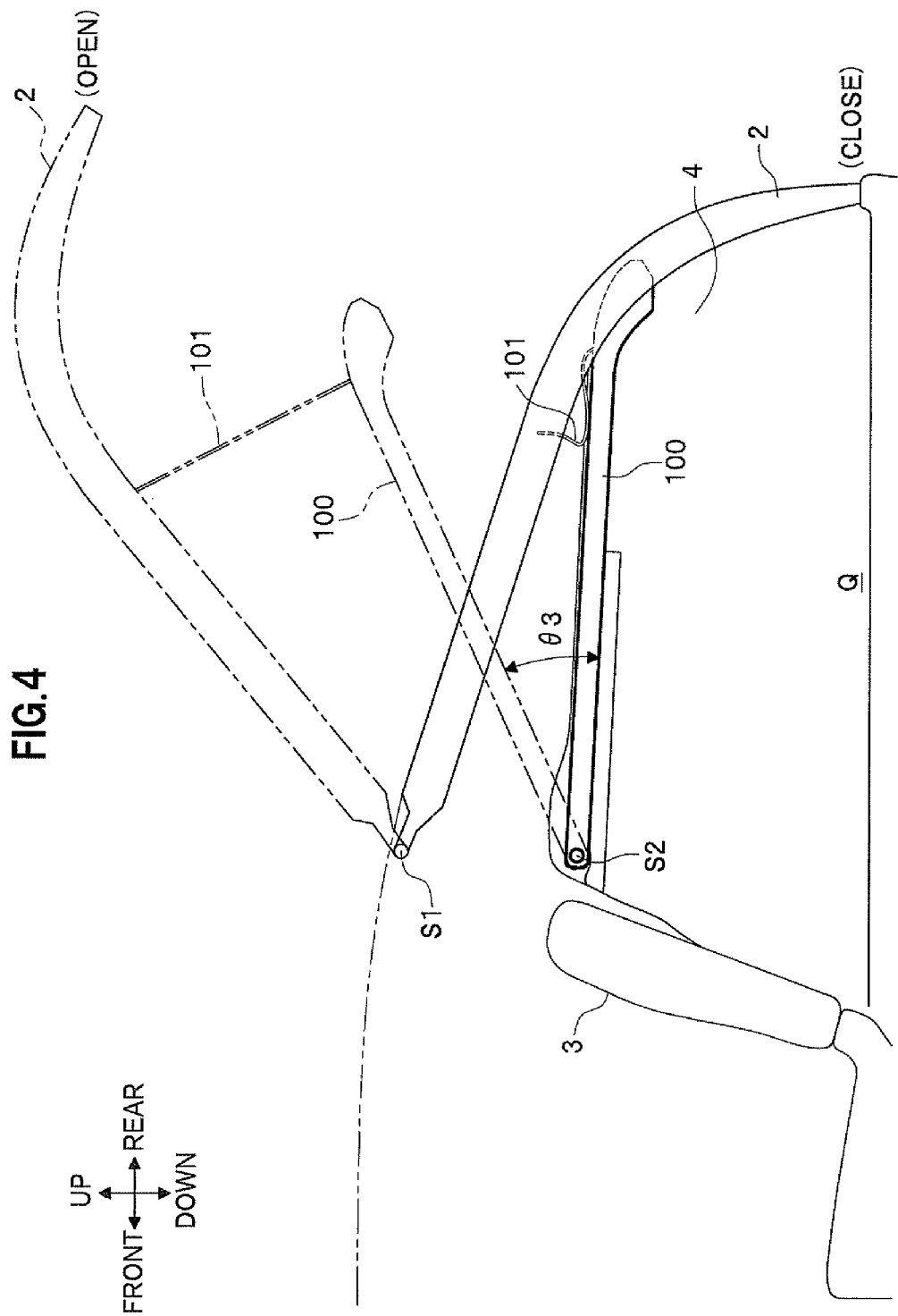
FIG. 4 is a cross-sectional view showing a rear portion of a vehicle which is provided with a parcel shelf structure as a comparative example.

By the way, as shown in FIG. 4 as a comparative example, in the parcel shelf 100 which is not divided, but formed as a plate which is provided with an axis S2 at its front end as the rotation fulcrum, if the parcel shelf 100 is pulled up by the strap 101, in order to open the tailgate 2 completely like the embodiment described above, it is necessary to pull up the parcel shelf 100 later than starting rotation of the tailgate 2 (after the tailgate 2 is opened by a predetermined angle). For this reason, as shown in FIG. 4, even if the tailgate 2 is opened completely, an angle θ3 by which the parcel shelf 100 is opened can not be increased.

Therefore, as described above, according to the parcel shelf structure of this embodiment, the parcel shelf 1 comprises the front shelf 10 and the rear shelf 20, the axis S2 is provided at the front end 10s of the front shelf 10 as the rotation fulcrum, and the rear shelf 20 is fixed to the tailgate 2. As a result, as indicated by a region R in FIG. 3, compared to the parcel shelf 100 which is provided with the parcel shelf structure shown in FIG. 4, it becomes possible to obtain larger upward opening which faces the trunk Q when the tailgate 2 is opened. In this way, an oppressive feeling (e.g., disturbance by the parcel shelf) for an operator can be reduced at the time of loading and unloading baggage. Also, opening largely as indicated by the region R facilitates loading/unloading baggage (goods) into/from an inner side (the side of the seatback 3) of the trunk.

In addition, the present invention is not limited to the above embodiments. For example, in this embodiment, the axis S2 is formed at the front end 10s of the front shelf 10 as the rotation fulcrum, but the axis S2 as the rotation fulcrum may be provided by a hinge portion behind the front end 10s of the front shelf 10.

What is claimed is:

1. A parcel shelf which divided into front and rear parts, the parcel shelf comprising:
   a front shelf having a front end which is rotatably supported by a vehicle body;
   a rear shelf which is fixed to a tailgate; and
   a strap which connects the tailgate to the front shelf, the strap being connected to the front shelf at a position rearward of the front end of the front shelf,
   wherein when the tailgate is opened, the front shelf is separated from the rear shelf, and when the tailgate is closed, the front shelf is in contact with the rear shelf such that the front shelf and the rear shelf are co-planar.

2. The parcel shelf of claim 1, further comprising at least one supporting portion which supports said front shelf, said supporting portion being attached to a side panel of the vehicle body.

3. The parcel shelf of claim 2, wherein said supporting portion has a step-shape.

4. The parcel shelf of claim 2, wherein said supporting portion is disposed at an upper edge portion of said side panel.

5. The parcel shelf of claim 3, wherein said supporting portion is disposed at an upper edge portion of said side panel.

* * * * *